(12) United States Patent
Robertsson et al.

(10) Patent No.: US 7,710,821 B2
(45) Date of Patent: May 4, 2010

(54) MULTIPLE ATTENUATION METHOD

(75) Inventors: Johan Robertsson, Oslo (NO); Clement Kostov, Great Wilbraham (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 876 days.

(21) Appl. No.: 10/569,066

(22) PCT Filed: Aug. 20, 2004

(86) PCT No.: PCT/GB2004/003596

§ 371 (c)(1),
(2), (4) Date: Oct. 10, 2006

(87) PCT Pub. No.: WO2005/019868

PCT Pub. Date: Mar. 3, 2005

(65) Prior Publication Data

US 2007/0189117 A1    Aug. 16, 2007

(30) Foreign Application Priority Data

Aug. 23, 2003  (GB)  ................. 0319956.9

(51) Int. Cl.
*G01V 1/38* (2006.01)

(52) U.S. Cl. ........................................... 367/24

(58) Field of Classification Search .............. 367/15, 367/24
See application file for complete search history.

(56) References Cited

U.S. PATENT DOCUMENTS

| | | | |
|---|---|---|---|
| 4,520,467 A * | 5/1985 | Berni | 367/24 |
| 4,706,225 A | 11/1987 | Raoult | |
| 4,752,916 A * | 6/1988 | Loewenthal | 367/24 |
| 4,935,903 A * | 6/1990 | Sanders et al. | 367/24 |
| 4,937,793 A | 6/1990 | Shuck et al. | |
| 4,979,150 A * | 12/1990 | Barr | 367/24 |
| 5,365,492 A | 11/1994 | Dragoset, Jr. | |
| 5,587,965 A | 12/1996 | Dragoset, Jr. et al. | |
| 5,621,700 A * | 4/1997 | Moldoveanu | 367/24 |
| 5,757,723 A | 5/1998 | Weglein et al. | |
| 5,995,905 A | 11/1999 | Ikelle et al. | |
| 6,101,448 A | 8/2000 | Ikelle et al. | |

(Continued)

FOREIGN PATENT DOCUMENTS

EP        0 400 775 A2    12/1990

(Continued)

OTHER PUBLICATIONS

Calvert et al The case for 4D monitoring with sparse OBC Abstract from 65th EAGE Conference and Exhibition, Stavanger, Norway, Jun. 2-5, 2003.

*Primary Examiner*—Scott A Hughes
(74) *Attorney, Agent, or Firm*—James McAlleenan; Vincent Loccisano; Brigid Laffey

(57) ABSTRACT

A method is described for reducing multiples in marine seismic data using at least two sets of signals representing seismic energy reflected and/or refracted from an earth structure using a plurality of seismic receivers located in a body of water with the two sets differing in the traveltime of signals through the body of water, separating said signals into up- and down-going wavefields and combining the two sets to remove multiples.

18 Claims, 3 Drawing Sheets

U.S. PATENT DOCUMENTS

| | | | |
|---|---|---|---|
| 6,477,470 B2 * | 11/2002 | Fokkema et al. | 702/17 |
| 6,529,445 B1 * | 3/2003 | Laws | 367/151 |
| 6,704,244 B1 * | 3/2004 | Vaage | 367/24 |
| 6,775,618 B1 * | 8/2004 | Robertsson et al. | 702/14 |
| 6,906,982 B2 * | 6/2005 | Calvert | 367/21 |
| 2004/0136266 A1 * | 7/2004 | Howlid et al. | 367/21 |

FOREIGN PATENT DOCUMENTS

| | | |
|---|---|---|
| EP | 0 400 775 A3 | 10/1991 |
| GB | 2 333 364 A | 7/1999 |
| GB | 2344889 * | 6/2000 |
| GB | 2 376 301 A | 12/2002 |
| GB | 2 379 741 A | 3/2003 |
| GB | 2 363 459 B | 4/2003 |
| GB | 2 384 068 A | 7/2003 |
| GB | 2 389 183 A | 12/2003 |
| GB | 2 406 645 B | 2/2006 |
| WO | 01/75481 A2 | 10/2001 |
| WO | 02/01254 A1 | 1/2002 |
| WO | 01/75481 A3 | 4/2002 |
| WO | 03/058281 A1 | 7/2003 |

* cited by examiner

MULTIPLE ATTENUATION METHOD

CROSS-REFERENCE TO RELATED APPLICATIONS

This application claims the benefits of priority from:
i) Application Number 0319956.9, entitled "MULTIPLE ATTENUATION METHOD," filed in the United Kingdom on Aug. 23, 2003; and
ii) Application Number PCT/GB2004/003596, entitled "MULTIPLE ATTENUATION METHOD," filed under the PCT on Aug. 20, 2004;

The present invention relates to methods of reducing or attenuating multiples in seismic data acquired through a marine acquisition or survey.

BACKGROUND OF THE INVENTION

Marine seismic surveys are usually conducted by towing an energy source and seismic detectors behind a vessel. The source imparts an acoustic wave to the water, creating a wavefield which travels coherently into the underlying earth. As the wavefield strikes interfaces between earth formations, or strata, it is reflected back through the earth and water to the detectors, where it is converted to electrical signals and recorded. Through analysis of these signals, it is possible to determine the shape, position, and lithology of the sub-bottom formations.

In other marine survey methods, the detectors and/or sources are placed at or close to the sea bottom, such as ocean bottom cables (OBCs) or in wells drilled into the sea bottom.

A seismic wave generated in (or reflected of) earth strata passes into the water in a generally upward direction. The wave that travels only once upwards, termed the "primary", travels through the water and past the seismic detector which records its presence. The wavefield then continues to travel upward to the water's surface (which can be regarded as a free surface), where it is reflected back downwards. This reflected, or "ghost", wavefield also travels through the water and past the detector(s), where it is again recorded. These down-going ghost reflections are an undesirable source of contamination of seismic data, since they obscure the interpretation of the desired up-going reflections from the earth's interior.

As described for example in the published international patent application WO-03/058281 ghost reflections or events can be regarded as being filtered or transformed versions of the direct signal $$D = G U \quad [1]$$

where D is the down-going wavefield, U is the desired up-going wavefield and G is the ghost filter or ghost operator that emulates the effects of the reflecting surface such as additional traveltime (or depth of the receiver or source below the reflecting surface) and phase changes. Knowledge of G or an approximation thereof, allows an operator to remove ghost from the recorded data using subtraction and/or an inverse operation.

In addition to generating ghosts, the free surface also gives rise to a series of one or more subsequent reflections or multiples that are reflection of ghost events in the deeper layers of the earth. In contrast to ghosts these events are registered in the up-going wavefield and are, hence, not separable from the desired primary event through a separation of the recorded wavefield into up- and down-going.

Free-surface multiple reflections can be classified according to their order, which is equal to the number of reflections from the free surface, e.g. first (second) order free-surface multiple reflections undergo one (two) downward reflections from the sea-surface before being detected as up-going by the hydrophones, and so on. Of course, the multiples themselves generate ghost events in the recorded data.

The problems relating to the removal of ghosts (deghosting) and of multiples attracted a lot of efforts in the industry and generated a large body of literature, of which only a small amount can be reasonably cited. For deghosting methods, reference is made for example to the above WO-03/058281, further to WO-02/01254 and U.S. Pat. No. 6,529,445 and GB patent applications 2363459 and 2379741.

Multiple removal methods are described for example in U.S. Pat. Nos. 5,757,723, 5,587,965, 5,995,905 and 6,101,448.

A recent publication by Calvert and Will presented as paper A15 at the 65th EAGE Conference June 2003 proposes to use a traveltime filter to suppress first order multiples in a time lapse seismic survey using an ocean bottom cable with sparsely distributed receivers to monitor changes in a subsurface reservoir.

It is an object of the present invention to provide a method for removing multiples from recorded or acquired marine seismic data.

SUMMARY OF THE INVENTION

In accordance with a first aspect of the invention, there is provided a method for reducing multiples in marine seismic data, said method comprising the steps of: obtaining at least two sets of signals representing seismic energy reflected and/or refracted from an earth structure using a plurality of seismic receivers located in a body of water, wherein the two sets differ in the traveltime of signals through the body of water, separating said signals into up- and down-going wavefields; and subtracting or otherwise combining the two sets to remove multiples.

The method can be applied to data acquired using towed streamers, vertical seismic profiling or ocean bottom cable acquisition techniques.

In a preferred embodiment the two sets differ in the traveltime of signals through the body of water located above said plurality of receivers.

In an advantageous variant of the invention one or both sets of signals are corrected for amplitude and/or other mismatches, preferably using a filter derived from matching clearly identifiable events in both data sets.

The invention advantageously takes into consideration the effects of a non-flat surface of the sea and, hence, corrects one or both sets of signals for effects of rough sea.

In a further preferred embodiment of the invention the surveys are acquired with the receivers located at near or essentially identical height above the sea bottom level at the acquisition of both sets of signals exploiting, for example, tidal changes or even pressure changes in the atmosphere above the water as a means to alter the traveltime. However the correction to make the receivers appear at the same height or, in general, at near or essentially identical positions during both surveys can be alternatively achieved using mathematical operators or data processing techniques.

In one variant of the invention the two survey are advantageously performed using a planar receiver line or array at two different times within a time span during which no significant change below the subsurface occurs, e.g. before a subterranean hydrocarbon reservoir alters its shape through fluid motions. In an alternative, the two survey are taken simultaneously using two planar receiver lines or array towed at different height in what is commonly referred to as over/under streamer configuration.

Also it is advantageous for the application of the invention that the seismic signals are acquired such that it is possible to perform an accurate auto-convolution operation on the acquired data set. In general, it is preferred for the survey to be performed such that, for at least a significant number of shot positions, shot positions are at some time during the survey occupied by a receiver, or, alternatively receivers are positioned sufficiently close to a (previous or later) shot position to allow an interpolation of the registered wavefield to such shot position.

In a preferred variant of the invention the two sets are not spatially filtered after the separation into up- and downgoing wavefields and, hence, the demultiple operation is used on a single trace without making use of neighboring traces recorded in the set.

These and other aspects of the invention will be apparent from the following detailed description of non-limitative examples and drawings.

DETAILED DESCRIPTION AND EXAMPLES

Figure 1:
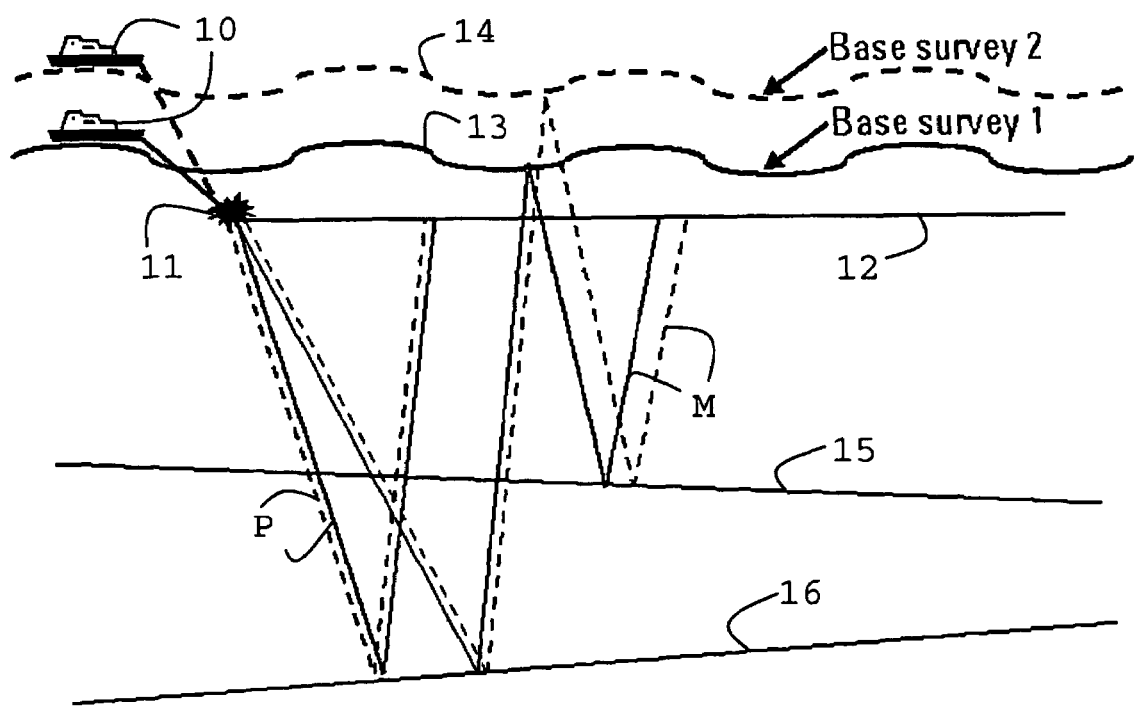
FIG. 1 illustrates the acquisition of two sets of marine seismic surveys in accordance with an example of the present invention.

In a first step in accordance with the present invention, a marine seimic survey is performed that includes the step of essentially repeating the survey, and hence, the source and receiver positions with different traveltimes for signal between the sea surface and the receiver positions.

For a conventional survey using a towed streamer configuration, a possible survey is illustrated in FIG. 1A.

In FIG. 1A, an exploration vessel 10 towing seismic sources 11 and receiver arrays (streamers) 12 is showing performing an otherwise essentially identical survey at two different tidal conditions. During the first survey the sea surface is shown as solid line 13. During the second survey the sea surface is shown as dashed line 14. The two surveys are performed over the same section of seabed 15 and both, source 11 and streamer 12 are shown at identical positions during both surveys with vessel 10 at two different heights relative to seafloor 15. The configuration shown can be achieved by towing both source and streamer at different depths relative to sea level.

FIG. 1 further illustrates a primary event (P) including the reflection of the source wave at a layer interface 16 below the seabed 15. Assuming that the conditions of both survey are perfectly matched, the P event becomes undistinguishable in both survey (a solid line illustrates the raypath in survey 1 and a dashed lined illustrates the raypath in survey 2).

A first order multiple event (M), however is shown moving along a different path in both surveys. All multiples have an extended paths caused by the greater height of the water column in the second survey.

It should be noted that the extended traveltime between the two surveys could be caused by effects others than tidal heaves. Temperature, salinity and other parameters that influence the sound velocity in water can equally lead to a change in traveltime. Air pressure or other weather changes may have also an influence on the traveltime that could be exploited for the purpose of the present invention.

In the following it is assumed that two surveys have been performed. The data sets are then separated into up-going U and down-going D wavefields. Separating the data sets is equivalent to identifying the ghost reflections in the recorded data or a de-ghosting of the data. Various methods for separating acquired data into up-going and down-going components have been proposed (see for example in the above references).

For example a pressure wavefield P can be de-ghosted using the following operation:

$$P\sim = \tfrac{1}{2}(P - (\rho\omega/|kz|)Vz) \qquad [2]$$

where P~ denotes the spatial and temporal Fourier transforms of the de-ghosted (up-going) component of the acquired pressure signals, P denotes the spatial and temporal Fourier transforms of the acquired pressure signals, $\rho$ denotes the water density, $\omega$ denotes the angular frequency, $|kz|$ is the absolute value of the vertical wavenumber, and Vz denotes the spatial and temporal Fourier transforms of the vertical component of the particle velocity. The particle velocity is not directly measured in conventional seismic surveys data sets, but can be calculated from those sets using for example methods described in the above referenced documents.

Using eq. [2] or any other de-ghosting method, the data can be separated into D (down-going) components and U (up-going) components. The U components include multiples M of first and higher orders.

As the methods in accordance with the invention include a step of subtracting one data set, it is advantageous to remove differences due to variations in source depths, source intensity, signal propagation in the water column below the receiver and other fluctuations through the use of, for example, a matched filter Fs. The matched filter can be determined by matching data acquired through both surveys in a window where no multiples are present such as the first water bottom arrival $\Delta tw$:

$$\int_{\Delta tw} dt(R1 - FsR2) = 0 \qquad [3]$$

where Ri (i=1, 2) are the recorded data of the two surveys.

It should be noted that the matched filter or equivalent methods can be used not only to match data from two different surveys but also to match data acquired during the same survey but with, for example, receivers at different location. Thus, using a matched filter or operator, data acquired by two different streamers at the same survey can be "moved" to the same position relative to the seafloor. An operator could thus use for example twin streamer methods as proposed in the published US patent application 20030147306 to acquire the two sets of data with a single survey. This and other methods for extrapolating data are known as such and sometimes collectively referred to as redatuming or wavefield extrapolation.

In the following example a first order multiple M is removed from the data set that is assumed to be deghosted.

The up/down separated (deghosted) data on the receiver side from survey i can be written using eq. [1] as follows:

$$Ui = \sim P + Mi$$

$$Di = \sim GiP + Gi\, Mi \qquad [4]$$

Where Ui is the up-going wavefield, Di is the down going wavefield, P represents the primaries, Mi represents the first-order surface-related multiples and Gi the surface-related ghost relative to the receiver array of the survey i (=1, 2). Equations [4] are approximations ignoring higher-order surface-related multiples, which will be addressed below.

Subtracting the up/down separated and matched data from the two surveys using eq. [3] results in $$U1 - Fs\, U2 = M1 - Fs\, M2 \qquad [5]$$

The down-going wavefield Di can be predicted from the up-going wavefield using equations [1] and [2] as:

$$D1 = G1\, U1$$

$$D2 = G2\, U2 \qquad [6]$$

The first-order surface-related multiples have suffered one additional ghost reflection. Assuming an approximate linear relation between the first-order multiples in the two surveys, the following equation [7] holds for primaries and first order multiples:

$$0 = G2\, M1 - G1\, Fm\, Fs\, M2 \qquad [7]$$

This equation [7] is improved by introducing the filter Fm to accommodate surface rippling or rough sea. The additional filter Fm can be computed for instance by minimizing energy around an interpreted window around the first water bottom reverberations or pegleg $\Delta t(pegleg)$ $$\int_{\Delta t(pegleg)} dt(G2M1 - G1FmFsM2) = 0 \qquad [8]$$

This procedure to compute Fm should be possible provided the energy in that window due to the water-layer peg-leg is much greater than energy from primaries.

Alternatively Fm could be derived following other methods: First-order multiples can be identified in the auto-convolution U1*U1 and U2*U2 (events before second water bottom multiple), and the matched filter described above can be derived by matching these events.

Alternatively, first-order multiple estimates can be derived independently for each dataset by for example a scattering series expansion as described in the above-reference documents, and using the identified events then a linear filter could be designed.

Combining equations [4]-[7] yields an expression for the first-order surface-related multiples in the first survey:

$$M1 = \frac{U2D1Fm(U1 - FsU2)}{FmU2D1 - U1D2} \qquad [9]$$

The result gained by applying equation [9] to the recorded data can then be adaptively subtracted from the recorded data of the first survey to yield a data set with primaries only (neglecting higher order multiples). An equation to subtract free-surface multiples from the second survey can be obtained in an analogous way.

The removal of higher order multiples require the application of a suitable ghost operator G that compensates for additional ghost reflections, the higher order multiples are subjected to.

The ghost removal is best performed on a reciprocally acquired data set. In such a set receiver positions and shot positions are at least partially interchanged during the survey. In other words, a receiver is positioned at a location where a shot was or is to be fired for a substantial number, if not the majority of shot locations. Of course, there are techniques that enable an operator to interpolate the signals of a receiver (virtually) located at a source position from traces recorded from neighboring positions.

An alternative is to use a fully recorded wavefield where the data are acquired or interpolated so that proper 2D or 3D prediction of free-surface multiples can be carried out, the direct arrivals are removed, if needed, 3D to 2D amplitude correction is applied, and receiver deghosting is applied as described above with additional source-side deghosting is applied as in conventional free-surface attenuation approaches.

Figure 2:
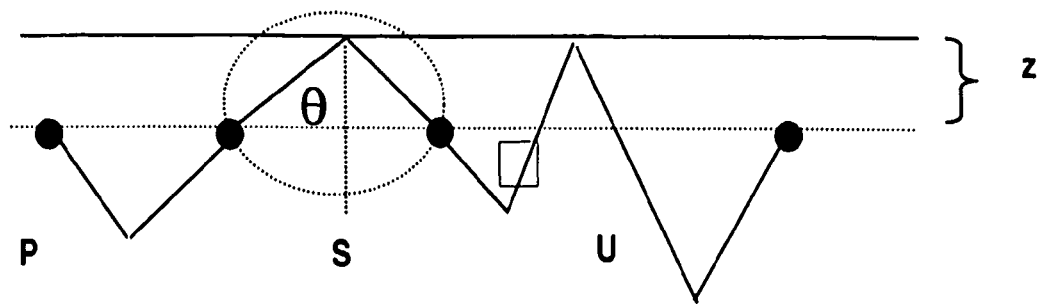
FIG. 2 is an illustration of the mathematical operations performed in accordance with an example of the present invention.

Then the following scattering series equation is applied relating data without free-surface multiples (P, primaries and internal multiples) to data with free-surface multiples (U):

$$U(k_s,k_g,\omega) = P(k_s,k_g,\omega) + w^{-1}\Sigma k\, P(k_s,k,\omega)S(k,z)\, U(k,k_g,\omega) \qquad [10]$$

where $k_s$, and $k_g$ are wavenumbers, corresponding respectively to shot and receiver positions. In 2D these are scalars, while in 3D the wavenumbers are two-component vectors. The value $w^{-1}$ is the inverse of the source signature (directional effects are assumed to have been compensated in pre-processing), the vector z is the distance between sources and receivers and the free-surface. For simplicity of presentation, sources and receivers are at the same level, but this is not a requirement for the acquisition. $S(k,z) = r(\theta)\cos(\theta)\omega/v\, \exp(j\omega z/(v\cos(\theta)))$, describes the interaction with the free-surface as shown in FIG. 2, where a primary event P, and a data event U are combined via convolution and an operator S which describes the interaction with the free-surface, located at height z above the sources and receivers.

The parameter $r(\theta)$ is the free-surface reflection coefficient, usually assumed equal to −1, and $\theta$ is the angle between the vertical and incident (or reflected) energy at the downward reflection point. Note that $\cos(\theta) = \mathrm{sqrt}(1 - v^2k^2/\omega^2)$.

Writing equation [2] for data acquired in two experiments (free-surface heights above the sources and receivers $z_1$ and $z_2$), yields equations $$U1(k_s,k_g,\omega) = P(k_s,k_g,\omega) + w^{-1}\Sigma k\, P(k_s,k,\omega)\, S(k,z1)\, U1(k,k_g,\omega) \qquad [11a]$$

$$U2(k_s,k_g,\omega) = P(k_s,k_g,\omega) + w^{-1}\Sigma k\, P(k_s,k,\omega)\, S(k,z2)\, U2(k,k_g,\omega) \qquad [11b]$$

It should be noted that equations [11a] and [11b] are exact in that they include not only first order multiples but also all higher orders of multiples.

Taking the difference of equations [11a] and [11b] leads to $$U1(k_s,k_g,\omega) - U2(k_s,k_g,\omega) = w^{-1}\Sigma k\, \{P(k_s,k,\omega)\, S(k,z1)\, U1(k,k_g,\omega) - P(k_s,k,\omega)\, S(k,z2)\, U2(k,k_g,\omega)\} \qquad [12]$$

Grouping all elements U1 ($k_s$, $k_g$, $\omega$) into a two-dimensional matrix (for each frequency $\omega$) denoted as D1 leads to a matrix equation:

$$w^{-1}P = (D1 - D2)\{S1\, D1 - S2\, D2\}^{-1} \qquad [13]$$

Combining equations [11a] and [13] obtains an expression for the primaries without the inverse of the source wavelet:

$$P = D1 - (D1-D2)\{S1\ D1 - S2\ D2\}^{-1} S1\ D1 \qquad [14]$$

This is an expression of the primaries, without the source wavelet, without series expansion, and in terms of the data from the two experiments. This experiment could be performed using for example different free-surface positions relative to the subsurface and the sources and receivers or other variations in the traveltime.

The expression $\{S1\ D1-S2\ D2\}^{-1}$ also give a measure for determining the conditions of a survey. Such a survey would be designed to yield a stable inversion of the matrix expression $\{S1\ D1-S2\ D2\}$.

Figure 3:
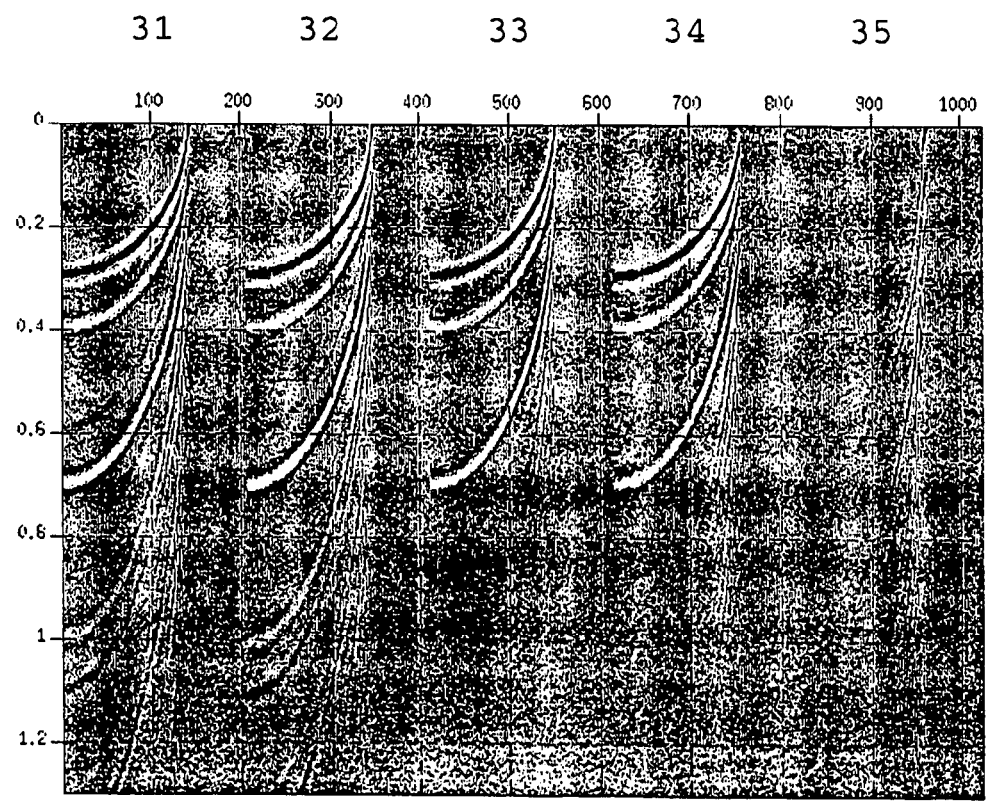
FIG. 3 is an synthetic data set illustrating the application of an example of the invention.

FIG. 3 illustrates a numerical example for the case of a 1D layered medium. There are shown synthetic events (response in tau-p domain for a 1D medium and a point source). Sources and receivers are at identical locations with respect to the subsurface in both experiments. In experiment (illustrated in the first column 31), the free-surface is 10 m above the sources and receivers, while in experiment (illustrated in the second column 32) the free-surface is at 20 m above. The synthetic primaries are shown in column 33, whereas the computed primaries using eq. [14] are shown in column 34. The residual energy at high p values on the right-most column 35 may be due to the absence of proper 2D/3D amplitude correction, needed because of the point source in the generation of the test data.

Figure 4:
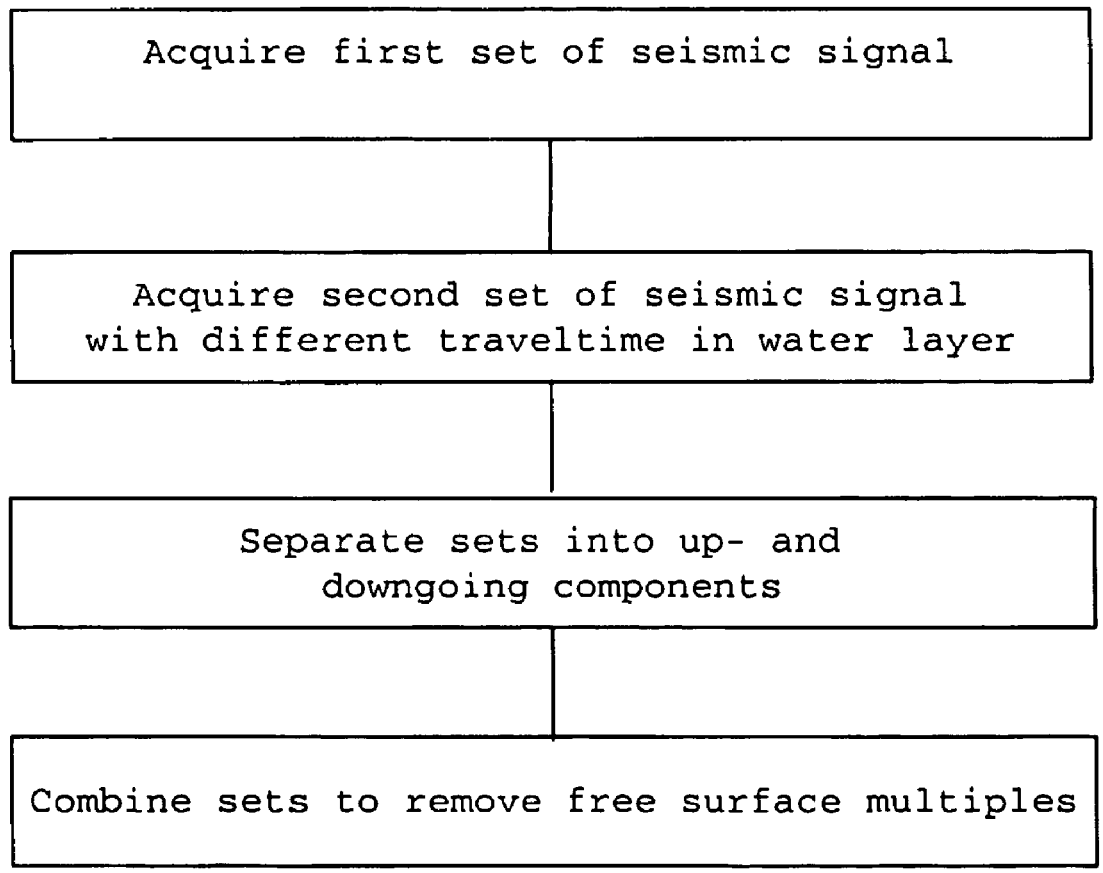
FIG. 4 is a block diagram of steps in accordance with an example of the present invention.

The methods described above are summarized in FIG. 4 including the steps 41, 42 of obtaining a first and second set of seismic data with different traveltimes for the free surface multiples but not for the primary events. The sets are deghosted (Step 43) and then processed together to remove the free surface multiples (Step 44).

The above described methods can be further refined by replacing the receiver ghost G function with a term that estimates the true location and time of the ghost reflection at the sea surface rather than at the receiver location.

The methods of the present invention have the advantage of not being dependent on a two-dimensional approximation to the data. In other words, they are applicable to signals reflected or diffracted into all spatial directions (3D scattering).

The method can be applied to towed streamer surveys and to sea bottom recordings such as OBC seismic surveys. The methods described herein can also be used for vertical seismic profiling (VSP) in marine wells.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. Method for attenuating multiples in marine seismic data, said method comprising the steps of:
   during a first seismic survey, obtaining a first set of signals representing seismic energy reflected and/or refracted from an earth structure using a first plurality of seismic receivers located in a body of water at a first height above a seafloor;
   during a second seismic survey, obtaining a second set of signals representing seismic energy reflected and/or refracted from the earth structure using a second plurality of seismic receivers located in the body of water at a second height above the seafloor; wherein:
   a first condition of the body of water during the first seismic survey is different to a second condition of the body of water during the second seismic survey; and
   the first and second height are essentially equal or where the first and second heights are different the first and second set of signals are shifted by processing the first and second set of signals to an essentially equal height;
   separating the first and the second set of signals into up- and down-going wavefields;
   deghosting the first and second set of signals; and
   using a processor to process a combination of the first and second set of signals to remove multiples.

2. The method of claim 1, wherein a first source is used to generate the first set of signals and a second source is used to generate the second set of signals.

3. The method of claim 2, wherein the first source, the first plurality of seismic receivers, the second source and the second plurality of seismic receivers comprise a single streamer.

4. The method of claim 1, wherein the first and second plurality of seismic receivers are located in streamers towed by a vessel.

5. The method of claim 1, wherein at least one of the first and second set of signals are corrected for amplitude and/or other mismatches.

6. The method of claim 1, wherein the difference between the first and second condition of the body of water is a traveltime of the seismic energy in the body of water between receiver location and water surface.

7. The method of claim 1, wherein the difference between the first and second condition of the body of water is a position of a surface of the body of water relative to the seafloor.

8. The method of claim 1, wherein the difference between the first and second condition of the body of water is a speed of travel of the seismic energy through the body of water.

9. The method of claim 1, wherein the step of using the processor to process the combination of the first and second set of signals to remove multiples comprises attenuating first, second and/or higher order multiples.

10. The method of claim 1, wherein at least one of the first and second set of signals are corrected for effects of a rough sea.

11. The method of claim 1, wherein the first and second set of signals are recorded at different times.

12. The method of claim 1, wherein the first set of receivers are disposed in a first streamer and the second set of receivers are disposed in a second streamer and the first and second streamer are towed at different water depths, and wherein the relative locations of the first and second set of receivers are configured to provide that the first condition of the body of water during the first seismic survey is different to the second condition of the body of water during the second seismic survey.

13. The method of claim 12, wherein the first and second streamers are towed by a vessel.

14. The method of claim 13, wherein a first distance of the first set of receivers from the vessel is different to a second distance of the second set of receivers from the vessel to provide that the first condition of the body of water during the first seismic survey is different to the second condition of the body of water during the second seismic survey.

15. The method of claim 1, wherein, if both the first and second set of signals are recorded simultaneously, two sets of receivers towed at different water depths are used, and, if each set is recorded at a different time, a planar receiver line or array is used.

16. The method of any of claim 1, wherein the step of using a processor to process a combination of the first and second set of signals to remove multiples is performed without combining neighboring traces of one set.

17. The method of claim 1, wherein the step of using a processor to process a combination of the first and second set of signals to remove multiples is performed without spatial filtering.

18. The method of claim 1, further comprising:

using a match filter to remove fluctuations between the first and the second seismic surveys, wherein the fluctuations comprise differences between the first and the second seismic survey other than the first and the second condition.

\* \* \* \* \*